(12) United States Patent
Ericson et al.

(10) Patent No.: US 6,992,655 B2
(45) Date of Patent: Jan. 31, 2006

(54) INPUT UNIT ARRANGEMENT

(75) Inventors: Petter Ericson, Malmo (SE); Christer Fahraeus, Lund (SE)

(73) Assignee: Anoto AB, Lund (SE)

( * ) Notice: Subject to any disclaimer, the term of this patent is extended or adjusted under 35 U.S.C. 154(b) by 654 days.

(21) Appl. No.: 09/784,551

(22) Filed: Feb. 16, 2001

(65) Prior Publication Data

US 2002/0044134 A1 Apr. 18, 2002

Related U.S. Application Data

(60) Provisional application No. 60/208,169, filed on May 31, 2000, provisional application No. 60/208,164, filed on May 31, 2000.

(30) Foreign Application Priority Data

Feb. 18, 2000 (SE) .................................. 0000541
Mar. 21, 2000 (SE) .................................. 0000939

(51) Int. Cl.
*G09G 5/08* (2006.01)
(52) U.S. Cl. ...................... 345/163; 345/173; 345/179; 178/18.01
(58) Field of Classification Search ........ 345/156–163, 345/173, 179–180, 169, 177, 172; 178/18.01–18.09, 178/19.01–20.01; 382/313
See application file for complete search history.

(56) References Cited

U.S. PATENT DOCUMENTS

| | | | |
|---|---|---|---|
| 4,804,949 A | 2/1989 | Faulkerson | |
| 4,814,553 A | 3/1989 | Joyce | |
| 5,294,792 A * | 3/1994 | Lewis et al. ................ | 340/706 |
| 5,852,434 A | 12/1998 | Sekendur | |
| 5,856,822 A * | 1/1999 | Du et al. ..................... | 345/73 |
| 5,932,863 A | 8/1999 | Rathus et al. | |
| 6,061,051 A * | 5/2000 | Chan et al. ................. | 345/173 |
| 6,128,007 A * | 10/2000 | Seybold ..................... | 345/179 |
| 6,310,988 B1 * | 10/2001 | Flores et al. ............... | 382/313 |
| 6,502,756 B1 | 1/2003 | Fahraeus | |
| 6,567,120 B1 * | 5/2003 | Hamamura et al. .... | 348/207.99 |

(Continued)

FOREIGN PATENT DOCUMENTS

WO    WO 9820446    5/1998

(Continued)

*Primary Examiner*—Bipin Shalwala
*Assistant Examiner*—Mansour M. Said
(74) *Attorney, Agent, or Firm*—Birch, Stewart, Kolasch & Birch, LLP (57) ABSTRACT

In an input unit arrangement use is made of an input unit in combination with a mouse pad, which is provided with a position-coding pattern which codes coordinates for a plurality of positions on the mouse pad. Areas on the mouse pad are provided with subsets of the position-coding pattern which are dedicated to different functions. The input unit can be caused to optically read the position-coding pattern, whereupon the input unit arrangement decodes the positions that are coded locally on the mouse pad. By placing the input unit within the various areas (110–120) on the mouse pad, a user can make the input unit arrangement carry out various functions, such as automatically switching from a mouse function, in which a cursor is controlled on a display on the basis of the decoded position, to an input function, in which information via the input unit is inputted into an electronic device, such as a computer, telephone, PDA etc. A method for controlling the input unit arrangement is also described, as is also use of an absolute position-coding pattern.

34 Claims, 2 Drawing Sheets

U.S. PATENT DOCUMENTS

| | | | |
|---|---|---|---|
| 6,603,464 B1 * | 8/2003 | Rabin | 345/179 |
| 2003/0046256 A1 * | 3/2003 | Hugosson et al. | 707/1 |

FOREIGN PATENT DOCUMENTS

| WO | WO 99/50787 | 10/1999 |
|---|---|---|
| WO | WO 9956200 | 11/1999 |
| WO | WO 9960467 | 11/1999 |
| WO | WO 9960468 | 11/1999 |
| WO | WO 0008593 | 2/2000 |
| WO | WO 0025293 | 5/2000 |
| WO | WO 0073981 | 12/2000 |
| WO | WO 0116691 | 3/2001 |
| WO | WO 0126032 | 4/2001 |
| WO | WO 01/61635 A2 | 8/2001 |

* cited by examiner

INPUT UNIT ARRANGEMENT

This application claims the benefit of Provisional Application Nos. 60/208,164 and 60/208,169 both filed on May 31, 2000.

TECHNICAL FIELD

This invention concerns an input unit arrangement with at least two functions. The invention also concerns a mouse pad, use of an absolute position-coding pattern and a method for controlling an input unit arrangement.

BACKGROUND OF THE INVENTION

A mouse is used to position a cursor on a computer screen and to give various commands to the computer.

Currently, the most common mouse is an electronic type. However, an optical mouse is also available.

JP 09190277 discloses an optical mouse which has a CCD line sensor for the X-axis and a CCD line sensor for the Y-axis. Data which is recorded by the CCD line sensors at a particular time is compared with data which is recorded at a subsequent time, by means of which the movement of the mouse in the X- and Y-direction can be determined.

U.S. Pat. No. 4,814,553 discloses a similar optical mouse which can determine its absolute position on a mouse pad which is provided with a specific line pattern.

The combination of a mouse function and an input function in an input unit is also known from, for instance, U.S. Pat. No. 4,804,949, WO00/08593 and U.S. Pat. No. 5,932,863. A further example of this is shown in the Applicant's International Patent Publication WO99/60468. This describes an input unit comprising an image-recording device for recording images and an image processing device for processing the images to achieve the input function and the mouse function. The mouse function is more specifically based on the determination of the relative positions of images recorded in succession.

It is a general requirement that a mouse or other input unit is to be able to carry out as many functions as possible and be used by the user in as flexible and simple a way as possible.

SUMMARY OF THE INVENTION

An object of the invention is therefore to make it possible for the user to switch between different functions of an input unit quickly and easily.

According to a first aspect, the invention relates to an input unit arrangement which comprises an image-recording device for recording images and a signal-processing device for processing the images to achieve a mouse function mode and an input function mode, the input unit arrangement being arranged to switch from the input function mode to the mouse function mode when the signal-processing device detects a predetermined position-coding pattern in one of said images.

Thus, instead of the user switching the function mode manually, the input unit arrangement automatically switches from the input function mode to the mouse function mode when the predetermined position-coding pattern is detected.

The position-coding pattern is advantageously located on a mouse pad which is used together with the input unit arrangement. When the user places the input unit on the mouse pad, the image-recording device records images of the position-coding pattern on the mouse pad. When the signal-processing device detects that the position-coding pattern is the predetermined one, it processes the recorded images in such a way that the mouse function mode is achieved.

In this connection it should pointed out that input function mode is defined here as a function mode whereby the user can input information into a receiver for storage and processing within the receiver, as a distinct from the mouse function mode which is used for positioning purposes.

The whole input unit arrangement can be contained in one casing, that is in one physical unit. It can also be divided between two physical casings, for example a user unit which the user operates and a computer with which the user unit communicates, in which case part of the signal-processing can be carried out in the computer. The signal-processing device can thus be fully integrated with the image-recording device, can be partially integrated with this or be separated from this.

Of course, the input unit arrangement can also be suitably arranged to switch from the mouse function mode to the input function mode when the signal-processing device detects a pattern different than the predetermined position-coding pattern in one of said images, so that an automatic switching is also achieved for the input function mode. The other pattern can be an arbitrary pattern, that is the signal-processing device detects that an image does not contain the predetermined position-coding pattern. Alternatively, the switching can also take place on the basis of positive identification of another predetermined pattern, but does not need to be a position-coding pattern.

The position-coding pattern is advantageously a first subset of an absolute position-coding pattern, which subset codes a plurality of absolute positions, the input unit arrangement being arranged to carry out the switching from the input function mode to the mouse function mode when the signal-processing device detects one of said plurality of absolute positions on the basis of the predetermined pattern.

An absolute position-coding pattern is advantageous as the identification of this requires little processor capacity in the input unit arrangement. The pattern can be detected in the form of the positions or coordinates which it codes. No matching of any previously stored pattern needs to be carried out. In addition, if the mouse function mode is based on position determination using an absolute position-coding pattern on a mouse pad, the input unit arrangement only needs to be supplemented by a simple program routine which checks whether the positions lie within the coordinate area which is coded by the predetermined position-coding pattern on the mouse pad and activates the mouse function mode if this is the case.

U.S. Pat. No. 5,852,434 describes an example of an absolute position-coding pattern. The Applicant's International Patent Applications WO00/73981 and PCT/SE00/01895 describe other examples of absolute position-coding patterns which can be used to digitize handwritten text which is written on a writing surface provided with this pattern, i.e. to input information into a computer. The patterns can, however, also be used to achieve a mouse function of an input unit arrangement. If the pattern codes a sufficiently large number of positions, a first subset of the pattern, that is a particular position or coordinate area, can be dedicated to the mouse function mode and a second subset of the pattern to the input function mode.

The arrangement is advantageously adapted to switch from the mouse function mode to the input function mode when it detects a position which is coded by a second subset of the absolute position-coding pattern. The second subset of the absolute position-coding pattern can, for example, be dedicated to recording of handwritten text, so that the signal-processing device, when detecting positions of coordinates which are coded by this part of the pattern, processes the coordinates as representing handwriting. Alternatively, the second subset can be dedicated to switching the input unit arrangement for recording of text, i.e. recording of characters from a base, so that the signal-processing device is caused to analyze the subsequent images for identification of characters. Alternatively, the second subset can be dedicated to switching the input unit arrangement for recording of images, so that the signal-processing device is caused to record and, optionally, put together the subsequent images. According to one more alternative, the second subset can be dedicated to switching the input unit arrangement for photographing, so that the signal-processing device is caused to record individual images, for instance triggered by an operating button included in the arrangement.

Thus, the input function mode may comprise different partial functions, between which the arrangement can also be switched automatically.

The mouse function mode may also comprise different partial functions, such as a relative mouse function, an absolute mouse function, a scrolling function or a control function, between which the arrangement can also be switched automatically. The partial functions of the mouse function mode will be described in more detail below in connection with the second aspect of the invention.

To achieve the various partial functions, the first and second subsets of the absolute position-coding pattern can in turn be divided into subregions, the input unit arrangement being adapted to achieve different partial functions depending upon which subregion is detected by the signal-processing device. Thus, the absolute position-coding pattern is divided in the form of a tree structure, which in some cases may be advantageous as regards the control of the input unit arrangement between its various functions.

The absolute position-coding pattern can be considered to code absolute positions which make up a virtual coordinate surface, on which each position is defined by two coordinates. If there are a plurality of virtual coordinate surfaces, a third coordinate can be used to define which coordinate surface is intended. According to an embodiment of the invention, unique regions or coordinate areas on such a virtual coordinate surface are dedicated to various function modes or to various partial functions within these. An input unit arrangement containing information about the virtual coordinate surface, or at least part thereof, can thus be caused to achieve a function mode or partial function by a simple comparison of the position coded by a current image with the region division of the virtual coordinate surface.

The ideas described above can, of course, be used in an input unit arrangement which has a mouse function only.

According to a second aspect, the invention therefore relates to an input unit arrangement which has a mouse function mode and which comprises an image-recording device for recording images and a signal-processing device for processing the images to achieve the mouse function mode, the signal-processing device being arranged to detect part of an absolute position-coding pattern in one of said images, determine a position based on the detected part of the absolute position-coding pattern, and establish to which of at least two regions of the absolute position-coding pattern the position belongs, the input unit arrangement being arranged to carry out various functions depending on which region the signal-processing device establishes.

The input unit arrangement thus contains information about at least two different regions or coordinate areas of the absolute position-coding pattern and has different functions associated with these regions.

The input unit arrangement is advantageously switchable to a control function for generating a command for control of an electronic device communicating with the input unit arrangement, such as a computer, telephone, PDA etc., when it detects a first of said at least two regions. The control function can be considered to constitute part of the mouse function mode since the user, instead of clicking with a mouse button, reads a part, associated with a region, of the absolute position-coding pattern. The user can thus use the input unit arrangement in essentially the same way both for positioning a cursor and for giving commands to the electronic device with which the input unit arrangement communicates.

The command can advantageously concern execution of software in the electronic device. The user can then, for example, cause a computer to open a program for electronic mail simply by placing the input unit arrangement on a part of the absolute position-coding pattern which codes a position within a region which is dedicated to this.

In addition, the input unit arrangement is advantageously switchable to a relative mouse function when the signal-processing device detects a position within a region dedicated to relative mouse function and absolute mouse function when the signal-processing device detects a position within a region dedicated to absolute mouse function.

The possibility of using both a relative mouse function and an absolute mouse function increases the flexibility for the user.

The arrangement is advantageously switchable to a scrolling function when the signal-processing device detects a position within a region dedicated to scrolling function. This thus replaces the scrolling roller which is to be found on some mechanical mice.

According to a third aspect, the invention concerns an input unit arrangement which has at least a first and a second function and which comprises an image-recording device for recording images and a signal-processing device for processing the images, the input unit arrangement being arranged to switch from the first function to the second function when the signal-processing device detects a predetermined position-coding pattern in one of said images.

The advantages of this generally usable input unit arrangement are evident from the above description, as are also preferred features thereof. The first and second functions can be, for example, some of the following: a relative mouse function, an absolute mouse function, a scrolling function, a control function, a text or image inputting function, a handwriting recording function or a photographing function.

It should be emphasized that the functions of the input unit arrangement need not be based on images. For instance, the handwriting recording function and the relative mouse function can be based on non-optical movement detection, such as via a trackball or acceleration sensors or by triangulation of electromagnetic signals. However, at least one of the first and second functions is preferably achieved via the processing of the images in the signal-processing device.

According to a fourth aspect, the invention concerns a mouse pad which is provided with a position-coding pattern which is divided into at least two regions or coordinate areas which are intended to achieve different functions of an input unit arrangement.

The advantages of this mouse pad are apparent from the above discussion of the input unit arrangement. The term "mouse pad" is in this context to be given a broad interpretation and is considered to comprise, for instance, a paper product with a position-coding pattern printed thereon, suitably with some kind of visual indications.

According to a fifth aspect, the invention concerns use of an absolute position-coding pattern to cause an input unit arrangement to switch from a first to a second function.

The advantages of this use are apparent from the above.

According to a sixth aspect, the invention relates to a method for controlling an input unit arrangement between a first and a second function, which input unit arrangement comprises an image-recording device for recording images and a signal-processing device for processing the images, the input unit arrangement being automatically switched from the first function to the second function when the signal-processing device detects a predetermined position-coding pattern in one of said images.

The advantages of this method are apparent from the description above, as are also preferred features of the method.

BRIEF DESCRIPTION OF THE DRAWINGS

The invention will now be described in more detail by way of example and with reference to the accompanying drawings, in which.

DESCRIPTION OF A PREFERRED EMBODIMENT

Figure 1:
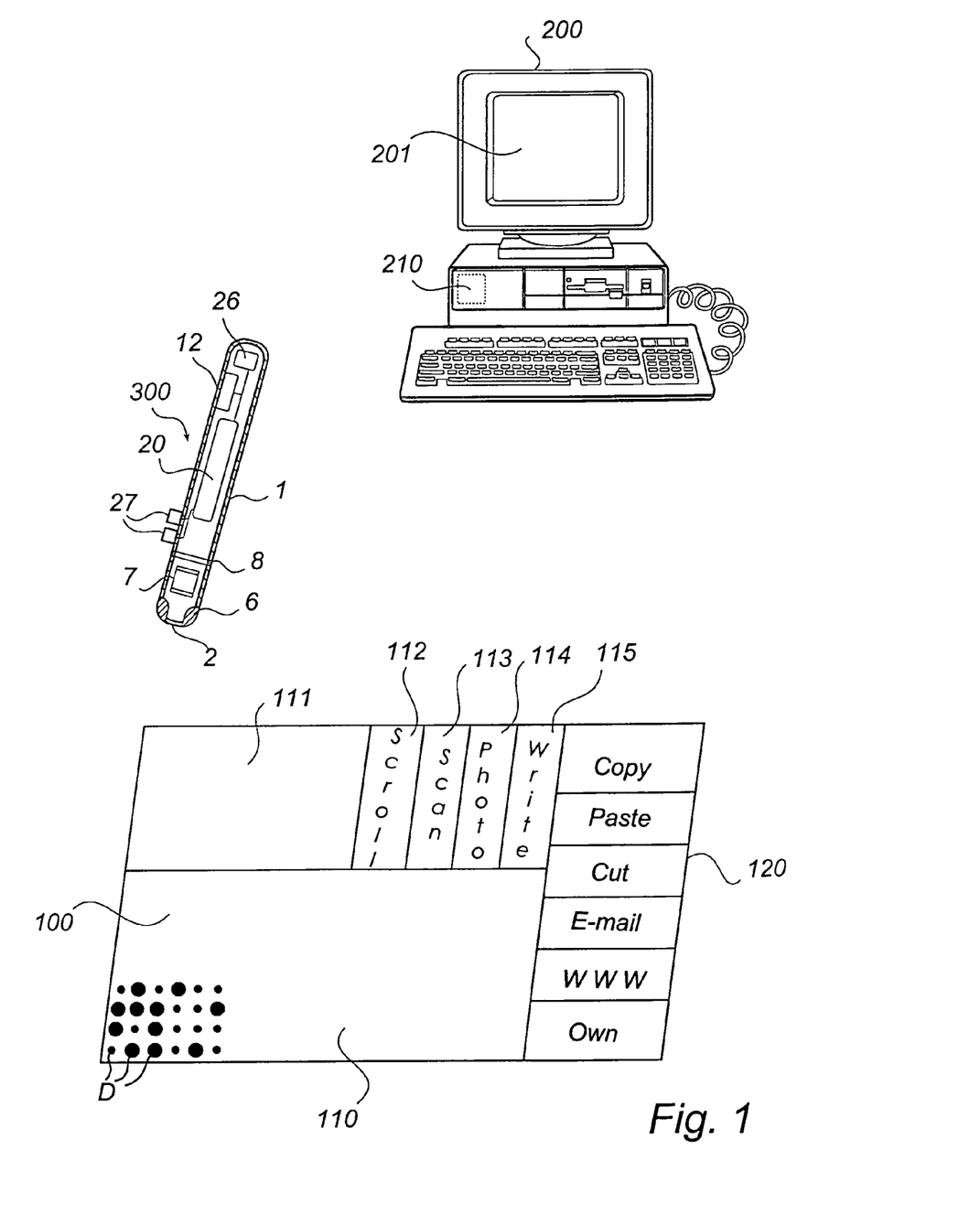
FIG. 1 is a schematic view of an embodiment of an input unit arrangement according to the invention, an embodiment of a mouse pad according to the invention, and a computer with which the input unit arrangement communicates, and FIGS. 2a–b schematically illustrate examples of the division of a virtual coordinate surface which is made up by the absolute position-coding pattern which codes positions on the mouse pad in FIG. 1.

The figure shows a mouse pad 100, a computer 200 and an input unit 300 for the computer 200. Together with programs in the computer 200, the input unit 300 forms an input unit arrangement according to the invention.

The mouse pad 100 is divided into a plurality of different areas. It has a first working field 110 for relative mouse function, a second working field 111 for absolute mouse function, a scrolling field 112, a scanner field 113 for switching to a scanner or reading pen function, a photo field 114 for switching to a photographing function, a handwriting field 115 for switching to a handwriting recording function, and a command field 120 in which a number of predetermined commands are indicated.

An absolute position-coding pattern 150 extends over the whole mouse pad 100. For the sake of clarity, the pattern is shown greatly enlarged on only a small part of the mouse pad 100.

The absolute position-coding pattern can be any type which systematically codes coordinates for a large number of positions on the mouse pad 100, so that the position of the input unit 300 can be determined regardless of where the input unit is placed on the mouse pad 100.

The pattern can, for example, be of the type shown in U.S. Pat. No. 5,852,434, where each position is coded by one specific symbol. However, it can advantageously be of the type shown in the Applicant's International Patent Applications WO00/73981, PCT/SE00/01667 and PCT/SE00/01895, where each position is coded by a plurality of symbols and each symbol contributes to the coding of several positions. These applications are considered to be part of the present application by means of this mention and are incorporated herewith by reference.

In these international applications the pattern is constructed of a small number of types of symbol. For example, it can be constructed of two different-sized dots which represent a one and a zero respectively or of a dot which can have four different positions in relation to a raster point and in this way can code four different values.

The figure shows the position-coding pattern on the mouse pad 100 constructed of symbols in the form of dots D of two different sizes. These represent a one and a zero respectively. A number of such symbols, for example 5×5 dots, combine to code a position on the mouse pad 100. Each position is in this context given by at least two coordinates.

Different parts of the position-coding pattern, that is different coordinate areas or regions, can be associated with different functions, as will be described in greater detail below. In this embodiment, the input unit arrangement has a mouse function mode and an input function mode. The mouse function mode includes, as partial functions, the relative mouse function, the absolute mouse function, the scrolling function and the control function. The input function mode includes, as partial functions, the scanner function, the photographing function and the handwriting recording function.

The input unit 300 has a casing 1 in the shape of a pen. One short side of the casing 1 has a window 2 through which images are recorded for different image-based functions of the input unit 300.

The casing 1 contains principally an optics part, an electronic part and a power supply.

The optics part comprises a plurality of light-emitting diodes 6, a lens system 7 and an optical sensor 8 which constitutes the interface with the electronic part. The light-emitting diodes 6 are intended to illuminate a surface of the base which is then below the window. The lens system 7 is intended to project an image of the surface which is below the window 2 onto the light-sensitive sensor 8 in as correct a way as possible. The optical sensor 8 can consist of an area sensor, such as a CMOS sensor or a CCD sensor with built-in A/D converter. Such sensors are commercially available.

The power supply for the input unit is obtained from a battery 12, but can alternatively be obtained from a mains connection (not shown).

The electronic part comprises a processor 20 with conventional associated circuits, such as various types of memory, and associated programs for carrying out the functions described here. The processor 20 forms part of the input unit arrangement's signal-processing device. In an alternative embodiment, the processor 20 is wholly or partly replaced by a specially adapted hardware circuit, such as an ASIC or FPGA. The electronic part also comprises a transceiver 26 for transmitting information to/from the computer 200. The transceiver 26 can be based on infrared technology, ultrasonics or radio technology for transmission over short distances, for example in accordance with the Bluetooth standard. The electronic part further comprises buttons 27, by means of which the user can control the input unit, for example switch it on and off.

The computer 200 is an ordinary personal computer with circuits and programs which make possible communication with the input unit 300. However, in this embodiment this also contains software which constitutes part of the input unit arrangement's signal-processing device. The software stores information about which functions are associated with different regions of the position-coding pattern. The software is shown symbolically by broken lines and reference numeral 210.

As mentioned, the input unit arrangement has a mouse function mode and an input function mode, including, inter alia, a scanner function.

In this embodiment, the scanner function is used to record text. The scanner function can be of the type described in the Applicant's Patent Publication WO98/20446, where text is recorded by recording a plurality of images with partially overlapping content and putting them together, after which the characters in the put-together image are localized, identified and stored in character-coded format. The scanner function can alternatively be used to input image information.

The mouse function mode is used to control a cursor on the display 201 of a computer 200 and to give different commands to the computer 200. The mouse function mode is also image-based and is achieved as follows. When the user moves the input unit 300 on the mouse pad 100, the sensor 8 records images at a predetermined frequency. Each image reproduces part of the position-coding pattern on the mouse pad 100, which part is sufficiently large for the processor 20 to be able to determine the position of the input unit 300 on the mouse pad 100. More specifically, the processor 20 localizes the symbols of which the position-coding pattern is constructed in each image, translates the symbols into coordinates according to predetermined rules and sends the coordinates to the computer 200 via the transceiver 26. The software 210 interprets the coordinates and converts these into positioning signals for a cursor on the display 201 of the computer.

The arrangement described above is used in the following way. First assume that the user wants to use the input unit 300 as an ordinary relative mouse. He places the input unit 300 in the first working field 110. The processor 20 detects the coordinates in the image recorded by the sensor 8, switches the input unit 300 to the mouse function mode and sends the coordinates to the computer 200, in which the software 210 detects that the coordinates belong to the working field 110 and that they are therefore to be interpreted as belonging to the relative mouse function. As long as the software 210 receives coordinates which belong to the working field 110 it will generate commands to the computer 200 for moving the cursor on the screen 201 in a corresponding way to the way the user has moved the input unit 300 over the working field 110. The working field 111 for absolute mouse function can be used in a corresponding way, with the difference that the software 210 maps absolute positions in the working field 111 to absolute positions of the cursor on the computer screen 201.

Assume next that the user edits a document in the computer 200. He can mark text in the same way as with a traditional mouse by "clicking" with the buttons 27. Assume that the user first wants to replace a first piece of text with a second piece of text which is situated elsewhere in the text. The user presses one of the buttons 27 and moves the input unit 300 over the second piece of text for marking thereof. Then he places the input unit 300 on the mouse pad 100 in that part of the command field 120 which is labeled with the command "cut". The input unit 300 then sends the coordinates read from this partial field to the software 210 in the computer 200 which identifies that the coordinates represent the command "cut" and creates the corresponding command for the word-processing application concerned, which cuts out the marked piece of text. The user next marks the first piece of text using the input unit 300 and then causes the computer 200 to paste the cut-out piece of text in place of the marked text by reading the coordinates for the command "paste" using the input unit 300.

Now assume that the user next wants to enter text from a newspaper in his document. He first positions the cursor in the required position using the mouse function mode of the input unit 300. Then he switches the input unit 300 to the scanner function by placing the input unit 300 on the scanner field 113 and scans in the text from the newspaper. The text is converted to character-coded format in the input unit 300 and transmitted to the software 210 which generates commands for inserting the text in the position marked by the cursor. Such a scanner unit is disclosed in, for instance, the Publication WO98/20446.

Now assume that the user sees an interesting web address in the newspaper he is reading and wants to look at this web page. He places the input unit 300 on the command field 120 with the text "www". Reading coordinates in this field results in the software 210 creating a command which opens a web browser program in the computer 200. Then the user can switch the input unit 300 to the scanner function in the way described above and read the web address from the newspaper. The recorded text is transferred to the computer 200 which can open the page corresponding to the recorded address.

Finally, assume that the user wants to send an e-mail to a friend. He places the input unit 300 on the e-mail field of the mouse pad. Reading a pair of coordinates in this field results in the software 210 generating a command to the computer 200 which causes it to open the e-mail program. The user can then record the required e-mail address and even the content of the message using the scanner function.

In addition, the user can himself define which functions are to be implemented upon the detection of coordinates within various coordinate areas, for example the one marked "user-defined" on the mouse pad 100. This can be carried out by means of the software 210.

As shown above, the user can carry out a number of functions in a convenient way by means of just one input unit 300 which reads coordinates on a mouse pad 100.

Of course other functions besides the above-mentioned scanner function and mouse function can be integrated into the input unit arrangement in order to further increase its usability.

For instance, as indicated in FIG. 1, it is possible to associate the coordinates which code positions within the scrolling field 112 with a scrolling function so that the software 210, when it detects positions within the scrolling field, generates a scrolling command to the computer 200. As a result, the user can perform scrolling only by placing the input unit 300 in the scrolling field 112.

One more example is a photographing function which allows recording of individual images at a distance from the input unit 300. When the input unit 300 records at least one position in the photo field 114 of the mouse pad 100, the input unit 300 switches to the photographing function, in which the user, by pressing one of the buttons 27, can capture images of the surroundings. The lens system must be adjusted so that a sharp image on the sensor 8 is obtained at an infinite distance, or normally a distance of about two meters. In the scanner function and the mouse functions, however, the lens system 7 is adjusted in such manner that a sharp image is obtained of an object which is positioned at the window 2, i.e. normally about two centimeters from the sensor 8. The input unit 300 can be programmed to reset from the photographing function to a standard function (default), such as the scanner function, after a predetermined period of time has passed, for instance after a few minutes.

The embodiment in FIG. 1 also comprises a handwriting recording function which allows recording of handwritten text. Examples of such handwriting recording are disclosed in WO99/60467. When the input unit 300 records a position in the handwriting field 115, it switches to the handwriting recording function, in which the user can enter information by moving the input unit over the working field 110. As an alternative to the writing field 115 in FIG. 1, the mouse pad 100 may comprise a working field (not shown) which is dedicated to recording of handwriting and within which information is written by means of the input unit 300.

In the example above, the input unit 300 is switched between different function positions. When the input unit 300 is in the mouse position, it generates a sequence of coordinates to the software in the computer, regardless of whether the arrangement is intended to operate with relative mouse function, absolute mouse function, scrolling function or control function. The software 210 then analyzes the received coordinates and executes adequate mouse functions on the basis thereof. In the photo position, the input unit 300 generates individual images while in the text inputting position, it performs character recognition (OCR) and then generates character-coded text, and in the handwriting position the input unit 300 generates either a sequence of coordinates forming a graphical trace of the handwriting or a version of the handwriting, which is subjected to character recognition (ICR).

The switching of the input unit 300 implies that its processor 20 must contain at least certain information about the coordinate areas which are associated with various functions. The use of a position-coding pattern allows the input unit 300, while demanding a small amount of processor power and storage capacity, to identify different function positions based on the detected coordinates.

In this context it may be advantageous to let a coherent subset or main region of the absolute position-coding pattern be dedicated to the mouse function mode and divide this main region into subregions which are dedicated to a partial function each. Thus, the input unit 300 need only detect coordinates within the main region in order to switch to the mouse position.

Figure 2A:
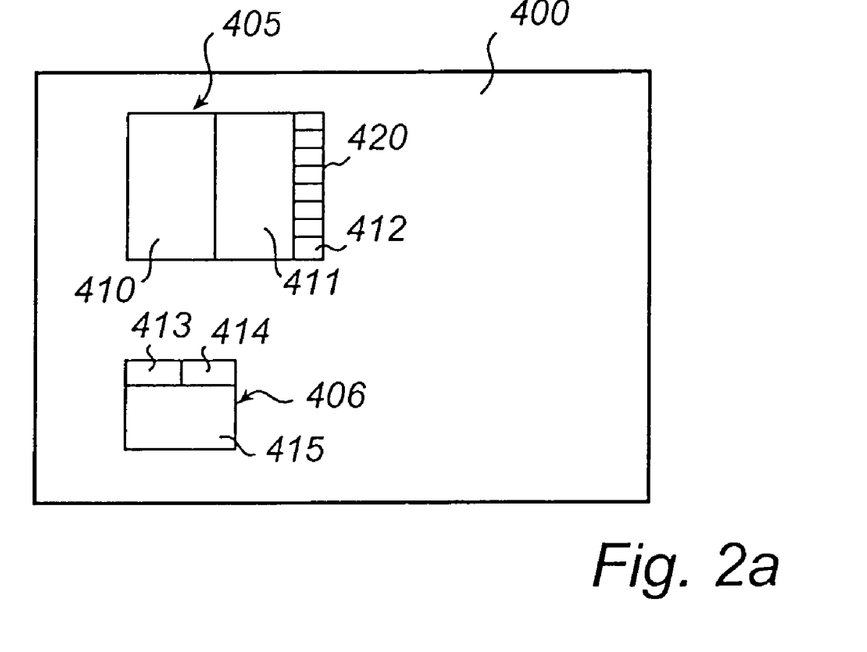

This embodiment is illustrated in FIG. 2*a*, which schematically shows a virtual coordinate surface 400 which is made up by all positions which the absolute position-coding pattern has the capacity to code. In FIG. 2*a*, a first main region 405 on the virtual surface 400 is dedicated to the mouse function mode. The main region 405 comprises a subregion 410 dedicated to the relative mouse function, a subregion 411 dedicated to the absolute mouse function, a subregion 412 dedicated to the scrolling function and a subregion 420 which is in turn additionally segmented and dedicated to the control function. A second main region 406 on the virtual surface 400 is dedicated to the input function mode and comprises a subregion 413 dedicated to the scanner function, a subregion 414 dedicated to the photographing function and a subregion 415 dedicated to the handwriting recording function.

Figure 2B:
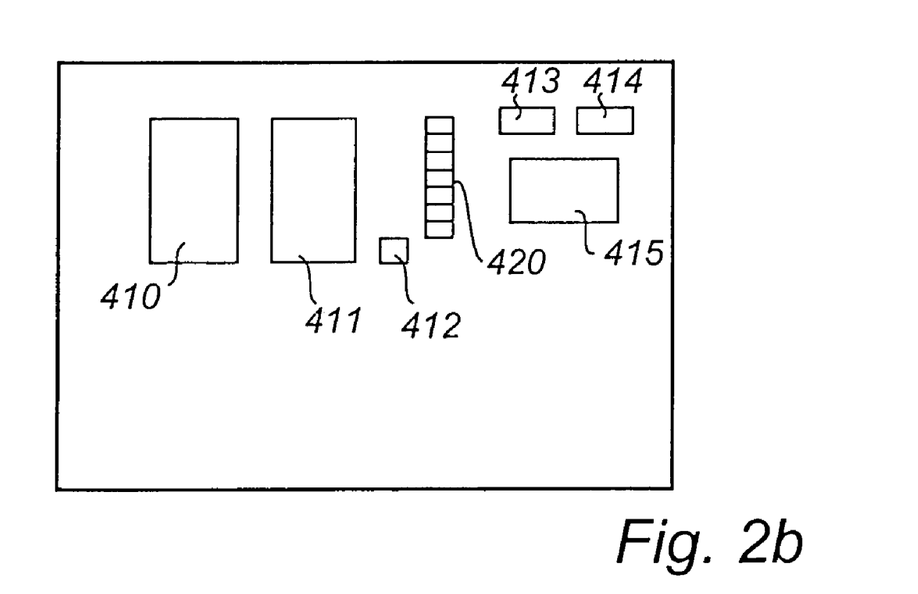

FIG. 2B shows schematically another example of the division of the virtual coordinate surface 400, where the different subregions 410–420 are not included in superordinate, coherent main regions.

The mouse pad 100 in FIG. 1 is thus provided with parts of the absolute position-coding pattern, more specifically the parts coding positions within selected coordinate areas 410–420 on the virtual surface 400.

As is also apparent from the above description, the arrangement is automatically switched to the function which is associated with the position which is coded by the pattern in the last recorded image. Moreover, the arrangement can be arranged in such manner that certain functions are connected statically and other functions are connected dynamically. More specifically, the mouse function mode can be connected only as long as associated positions are detected, i.e. dynamically, while the arrangement remains connected in the scanner function and the photographing function also when the input unit is raised from the mouse pad, i.e. these functions are connected statically. This means that the arrangement is automatically switched back to the last static function, whereby the user's managing of the arrangement is facilitated. In an alternative, it is however conceivable for all functions to be connected statically.

The description above is only intended to provide an example of how the arrangement according to the invention can be designed. A person skilled in the art can, with the aid of the summary of the invention, provide a number of variants of this example within the scope of the appended claims.

For instance, the input unit arrangement need not have both an input function mode and a mouse function mode. It can have a mouse function mode only, in which case the reading of the coordinates on the mouse pad is used in the same way as above, but of course without switching to an input function mode. In a further generalized embodiment, the input unit arrangement is switched between arbitrary functions when detecting a predetermined position-coding pattern.

All functions need not be controlled by coordinate reading. Some of them can controlled using the buttons on the input unit instead.

In the embodiment described, a switching of the input unit between different function positions takes place on the basis of the detected coordinates, while the software in the computer carries out the switching between different partial functions within the scope of the mouse function mode. The operations of the arrangement can, however, take place, arbitrarily distributed among the input unit and the computer. In an extreme case, all processing takes place in the input unit, which generates control commands and/or processed data to the computer. Alternatively, character recognition and similar subsequent processing can be located in the computer, which as a rule has more processor power and storage capacity than the input unit. In another extreme case, the input unit is only arranged to output the recorded images to the computer, in which the software detects coordinates and switches the arrangement between different functions.

It should also be emphasized that the input unit arrangement can communicate with other types of computer-based devices, for instance a PDA or a mobile phone.

What we claim and desire to secure by Letters Patent is:

1. An input unit arrangement for controlling an electronic device, comprising:
   a base;
   a position-coding pattern provided on said base and coding a first and second sets of absolute positions on spatially separate areas of said base; said first and second sets of absolute positions being mutually exclusive and coded by spatially separate first and second subsets of said position-coding pattern;
   a handheld image-recording device for recording images of said position-coding pattern; and a signal-processing device for deriving at least one position from the position coding pattern in the recorded image, said signal-processing device providing an instruction to the electronic device to perform a first function when said at least one absolute position belongs to the first set, and a second function when said at least one absolute position belongs to the second set.

2. The input unit arrangement of claim 1, wherein said signal-processing device, in said first function and based on said at least one absolute position, generates signals for positioning a cursor on a display unit of the electronic device.

3. The input unit arrangement of claim 1, wherein the first function operates on a display control function of the electronic device.

4. The input unit arrangement of claim 3, wherein the first function operates on the display control function to map said first set of absolute positions to corresponding absolute positions on a display unit of the electronic device.

5. The input unit arrangement of claim 3, wherein the first function operates on the display control function to map said first set of absolute positions to corresponding relative positions on a display unit of the electronic device.

6. The input unit arrangement of claim 3, wherein the first function operates on a display control function to effect scrolling.

7. The input unit arrangement of claim 1, wherein said second function is an input function of the input unit arrangement.

8. The input unit arrangement of claim 7, wherein said input function is selected from the group consisting of: a scanner function for inputting an image and/or text, a photographing function for inputting a photograph, and a handwriting recording function for inputting handwriting.

9. The input unit arrangement of claim 8, wherein said signal-processing device, in said handwriting recording function, records a handwriting stroke as a sequence of absolute positions derived from said images.

10. The input unit arrangement of claim 9, wherein said sequence of absolute positions belongs to the second set.

11. The input unit arrangement of claim 1, wherein said second function is an control function for generating a controlling command for the electronic device.

12. The input unit arrangement of claim 11, wherein said controlling command is a command for executing software on the electronic device.

13. A pad for use in an input arrangement having an input sensor reading a position-coding pattern and providing a signal to an electronic device to provide instruction thereto, comprising:
a base;
a position-coding pattern provided on said base and coding a first and second sets of absolute positions on spatially separate areas of said base; said first and second sets of absolute positions being mutually exclusive and coded by spatially separate first and second subsets of said position-coding pattern;
said first and second subsets of absolute positions being associated with first and second functions of said electronic device, respectively, and, when read by the input sensor, allowing the input sensor to instruct said electronic device to perform the function selected by use of the input sensor.

14. The pad according to claim 13, further comprising a visual indication provided on said base in association with each of said first and second subsets, said visual indication illustrating the first and second functions, respectively.

15. The pad according to claim 13, wherein said second function is a control function generating a command for controlling the electronic device.

16. The pad according to claim 15, wherein the controlling command is a command for executing software on the electronic device.

17. The pad of claim 13, wherein the first function operates on a display control function of the electronic device.

18. The pad of claim 17, wherein the first function operates on the display control function to map said first set of absolute positions to corresponding absolute positions on a display unit of the electronic device.

19. The pad of claim 17, wherein the first function operates on the display control function to map said first set of absolute positions to corresponding relative positions on a display unit of the electronic device.

20. The pad of claim 13, wherein said second function is an input function of the input unit arrangement.

21. The pad of claim 20, wherein said input function is selected from the group consisting of: a scanner function for inputting an image and/or text, a photographing function for inputting a photograph, and a handwriting recording function for inputting handwriting.

22. A method for controlling an electronic device between a first and a second function, using a handheld image recording device interacting with a position-code pattern comprising:
operating the handheld image-recording device for recording images of the position-coding pattern provided on a base, the position coding pattern coding a first and second sets of absolute positions on spatially separate areas of the base; said first and second sets of absolute positions being mutually exclusive and coded by spatially separate first and second subsets of said position-coding pattern, and
operating a signal-processing device for processing the images to derive at least one position from the position coding pattern in the recorded image, providing an instruction to the electronic device to perform a first function when said at least one absolute position belongs to the first set, and a second function when said at least one absolute position belongs to the second set.

23. The method according to claim 22, further comprising: operating said signal-processing device to control said electronic device to effect at least one of the first and second functions based on said images.

24. The method of claim 22, further comprising: operating, in said first function and based on said at least one absolute position, said signal-processing device to generate signals for positioning a cursor on a display unit of the electronic device.

25. The method of claim 22, wherein the first function operates on a display control function of the electronic device.

26. The method of claim 25, wherein the first function operates on the display control function to map said first set of absolute positions to corresponding absolute positions on a display unit of the electronic device.

27. The method of claim 25, wherein the first function operates on the display control function to map said first set of absolute positions to corresponding relative positions on a display unit of the electronic device.

28. The method of claim 25, wherein the first function operates on the display control function to effect scrolling.

29. The method of claim 22, wherein said second function is an input function of the input unit arrangement.

30. The method of claim 29, wherein said input function is selected from the group consisting of: a scanner function for inputting an image and/or text, a photographing function for inputting a photograph, and a handwriting recording function for inputting handwriting.

31. The method of claim 30, wherein said signal-processing device, in said handwriting recording function, records a handwriting stroke as a sequence of absolute positions derived from said images.

32. The method of claim 31, wherein said sequence of absolute positions belongs to the second set.

33. The method of claim 31, wherein said second function is a control function for generating a controlling command for the electronic device.

34. The method of claim 33, wherein said controlling command is a command for executing software on the electronic device.

* * * * *